(12) United States Patent
Tobari

(10) Patent No.: US 7,417,628 B2
(45) Date of Patent: Aug. 26, 2008

(54) LIQUID CRYSTAL DISPLAY APPARATUS

(75) Inventor: Tomohiro Tobari, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 298 days.

(21) Appl. No.: 11/328,230

(22) Filed: Jan. 10, 2006

(65) Prior Publication Data

US 2006/0164402 A1    Jul. 27, 2006

(30) Foreign Application Priority Data

Jan. 26, 2005  (JP)  ............................. 2005-018241

(51) Int. Cl.
- *G09G 5/00* (2006.01)
- *G02F 1/1333* (2006.01)

(52) U.S. Cl. .......................... 345/173; 349/58; 349/17; 349/152

(58) Field of Classification Search .................. 349/58, 349/16, 17, 61, 69, 70, 71, 49, 150, 152, 349/153, 193; 345/173
See application file for complete search history.

(56) References Cited

U.S. PATENT DOCUMENTS

| | | | |
|---|---|---|---|
| 4,988,837 A * | 1/1991 | Murakami et al. | 178/18.07 |
| 6,252,563 B1 * | 6/2001 | Tada et al. | 345/1.1 |
| 6,685,328 B1 * | 2/2004 | Hanson et al. | 362/610 |
| 2002/0145595 A1 * | 10/2002 | Satoh | 345/173 |
| 2005/0185111 A1 * | 8/2005 | Matsuoka | 349/58 |
| 2006/0164402 A1 * | 7/2006 | Tobari | 345/173 |

FOREIGN PATENT DOCUMENTS

JP    2004-212973    7/2004

* cited by examiner

*Primary Examiner*—Brian M Healy
(74) *Attorney, Agent, or Firm*—Oblon, Spivak, McClelland, Maier & Neustadt, P.C.

(57) ABSTRACT

A liquid crystal display apparatus comprises a liquid crystal display panel including a display region, a planar light source device having a light exit surface which faces the liquid crystal display panel and from which planar light exits toward the liquid crystal display panel, and a back surface located opposite to the light exit surface, a coordinates position detecting device which detects coordinates of a position designated on the display region; and a frame which has a projection and supports the liquid crystal display panel and the planar light source, the projection being formed integrally with the frame and extending along the back surface with a distance corresponding to a thickness of the coordinates position detecting device from the planar light source device. The coordinates position detecting device is interposed between the projection and the planar light source device and supported by the projection.

4 Claims, 4 Drawing Sheets

LIQUID CRYSTAL DISPLAY APPARATUS

CROSS-REFERENCE TO RELATED APPLICATIONS

This application is based upon and claims the benefit of priority from prior Japanese Patent Application No. 2005-018241, filed Jan. 26, 2005, the entire contents of which are incorporated herein by reference.

BACKGROUND OF THE INVENTION

1. Field of the Invention

The present invention relates to a liquid crystal display apparatus including a coordinates position detecting device.

2. Description of the Related Art

Generally, a liquid crystal display apparatus comprises a liquid crystal display panel having a display region in which a plurality of display pixels are arrayed; a circuit board, which is electrically connected to the liquid crystal display panel and supplies a drive signal to the display panel; a planar light source device, which illuminates the liquid crystal display panel from behind it; and a frame which supports the liquid crystal display panel and the planar light source. The circuit board is connected to a side end of the liquid crystal display panel by means of, for example, a flexible board. The flexible board is bent so that the circuit board is arranged on the back side of the planar light source device.

In recent years, a type of liquid crystal display apparatus has been developed, which has a function for inputting data through a display region of a liquid crystal display panel. This type of liquid crystal display apparatus may have a coordinates position detecting device, which detects the coordinates of a position selected by a position indicating device on the display region of the liquid crystal display panel. In general, the coordinates position detecting device is inserted between the circuit board and the planar light source device on the back side of the planar light source device. However, the ordinary frame does not necessarily have a structure to hold the coordinates position detecting device and the circuit board. Therefore, it is difficult for the frame to hold the coordinates position detecting device.

Jpn. Pat. Appln. KOKAI Publication No. 2004-212973 proposes a liquid crystal display apparatus having a plate member for fixing a coordinates position detecting device and a circuit board to a frame.

In the method described in the above publication, the circuit board and the coordinates position detecting device are first placed in predetermined positions and then fixed by the plate member to the frame. Therefore, it was difficult to position the circuit board and the coordinates position detecting device relative to each other. Further, since the plate member is laid over the coordinates position detecting device and the circuit board, the thickness of the liquid crystal display apparatus may be increased by the thickness of the plate member.

BRIEF SUMMARY OF THE INVENTION

An object of the present invention is to provide a liquid crystal display apparatus, in which a circuit board and a coordinates position detecting device are positioned in predetermined positions without increasing the thickness of the liquid crystal display apparatus.

According to an aspect of the present invention, there is provided a liquid crystal display apparatus comprising: a liquid crystal display panel including a display region in which a plurality of pixels are arrayed; a planar light source device having a light exit surface which faces the liquid crystal display panel and from which planar light exits toward the liquid crystal display panel, and a back surface located opposite to the light exit surface; a coordinates position detecting device which detects coordinates of a position designated on the display region; and a frame which has a projection and supports the liquid crystal display panel and the planar light source, the projection being formed integrally with the frame and extending along the back surface of the planar light source device with a distance corresponding to a thickness of the coordinates position detecting device from the planar light source device, wherein the coordinates position detecting device is interposed between the projection and the planar light source device and supported by the projection.

According to the liquid crystal display apparatus, a circuit board and a coordinates position detecting device are positioned in predetermined positions without increasing the thickness of the liquid crystal display apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
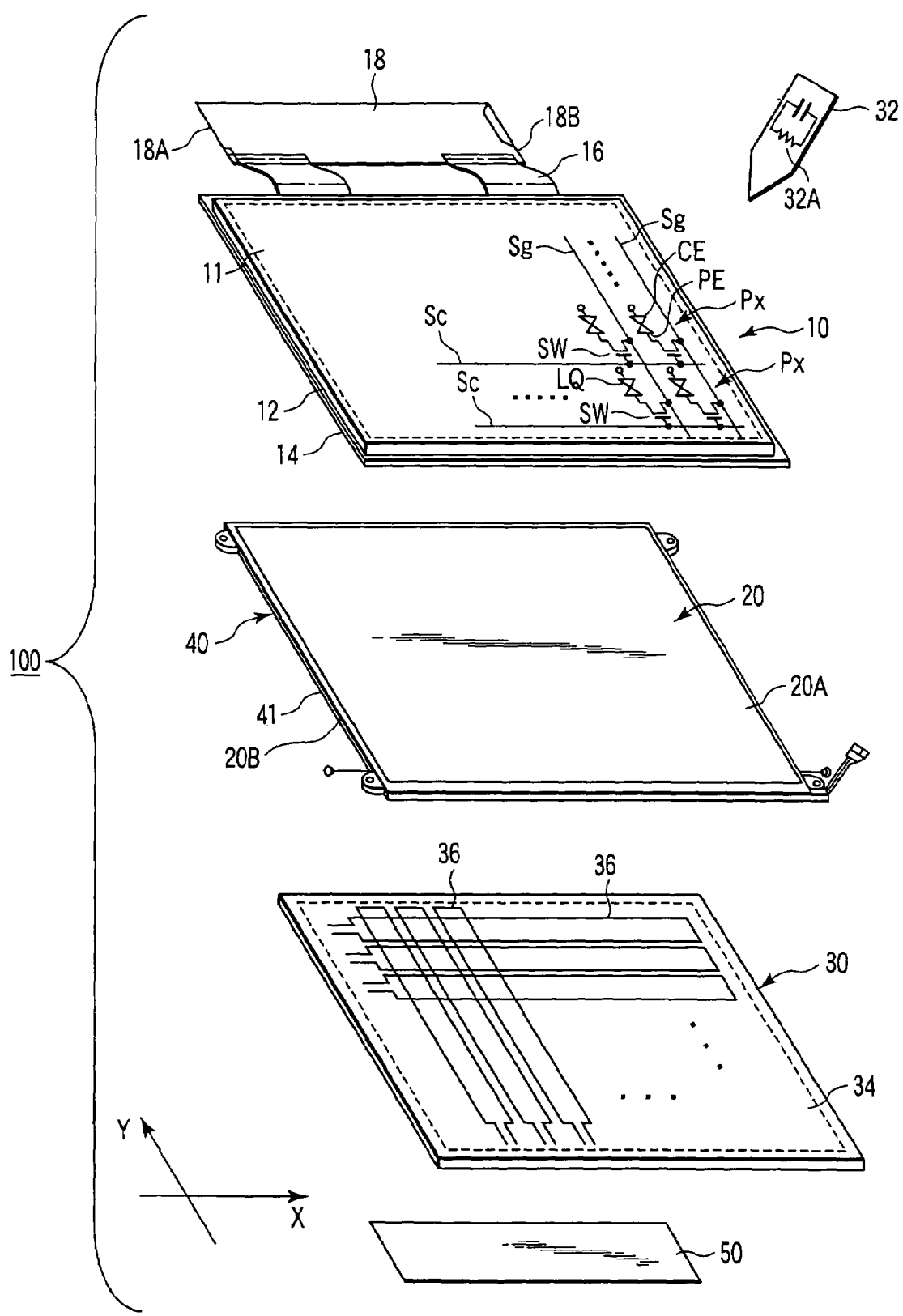
FIG. 1 is an exploded perspective view of a liquid crystal display apparatus according to one embodiment of the present invention.

A liquid crystal display apparatus 100 according to an embodiment of the present invention will be described with reference to the accompanying drawings. As shown in FIG. 1, the liquid crystal display apparatus 100 comprises a liquid crystal display panel 10, a planar light source device 20 which illuminates the liquid crystal display panel 10 from behind it, and a coordinates position detecting device 30 arranged on the side of a back surface 20B of the planar light source device 20.

The liquid crystal display panel 10 comprises a pair of substrates which are arranged opposite to each other; that is, an array substrate 12 and a counter substrate 14. It also comprises a liquid crystal layer LQ, which is sandwiched between the array substrate 12 and the counter substrate 14. The liquid crystal display panel 10 has a substantially rectangular display region 11, which displays images.

The display region 11 comprises a plurality of display pixels PX arranged in a matrix. The array substrate 12 has, in the display region 11, a plurality of scanning lines Sc extending in a row direction (X direction) of the pixels PX, a plurality of signal lines Sg extending in a column direction (Y direction) of the pixels PX, a plurality of switching elements SW provided in the respective pixels PX, and pixel electrodes PE connected to the switching elements SW. In each pixel PX, the switching element SW is arranged near the intersection between the scanning line Sc and the signal line Sg. The counter substrate 14 comprises a counter electrode CE common to all the pixel electrodes PE in the display region 11.

The array substrate 12 and the counter substrate 14 are arranged such that the pixel electrodes PE and the counter electrode CE face each other with a gap therebetween. A liquid crystal layer LQ is formed of a liquid crystal composition sealed in the gap between the array substrate 12 and the counter substrate 14.

The circuit board 18 is electrically connected to a side end of the liquid crystal display panel 10 by a flexible board 16, and supplies a drive signal to the liquid crystal display panel 10. The circuit board 18 is arranged on the back surface 20B of the planar light source device 20 by bending the flexible board 16 toward the back surface 20B of the planar light source device 20.

The planar light source device 20 comprises a light exit surface 20A which faces the liquid crystal display panel 10 and from which planar light exits toward the liquid crystal display panel 10; and the back surface 20B located opposite to the light exit surface 20A. The light exit surface 20A has a substantially rectangular light exit region, from which illumination light exits. The planar light source device 20 is stacked on the back surface of the liquid crystal display panel 10 such that the light exit region of the planar light source device 20 faces the display region 11 of the liquid crystal display panel 10.

Figure 2:
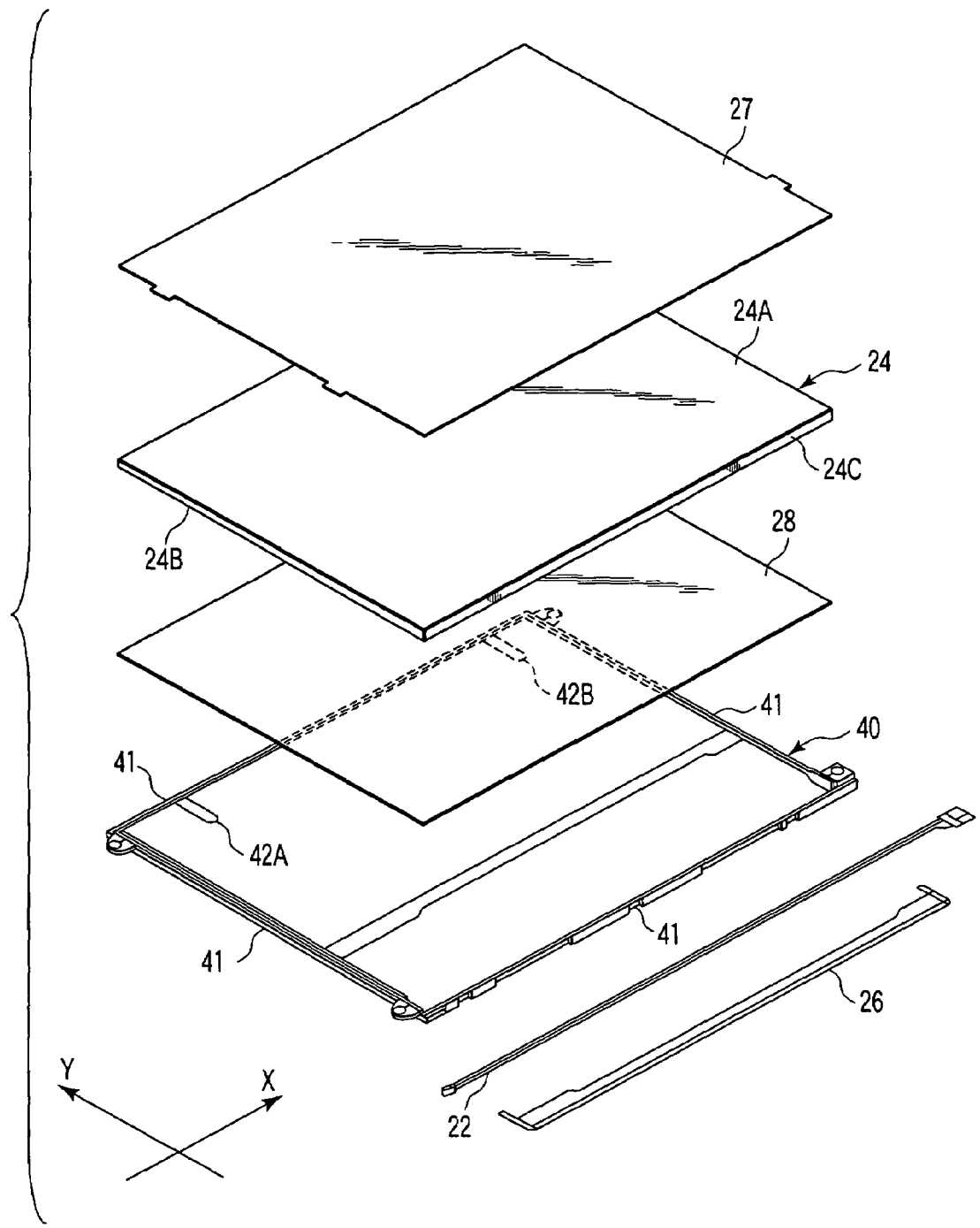
FIG. 2 is an exploded perspective view of the planar light source device of the liquid crystal display apparatus shown in FIG. 1.

As shown in FIG. 2, the planar light source device 20 has a cold cathode fluorescent tube 22 serving as a light source, a light guide 24 which guides light emitted from the cold cathode fluorescent tube 22 to the liquid crystal display panel 10, and a reflector 26 which causes the light emitted from the cold cathode fluorescent tube 22 to be incident on the light guide 24. The light guide 24 is formed of transparent resin. It has a light exit surface 24A, from which the light exits; and a counter surface 24B opposing to the light exit surface 24A. The light guide 24 has a wedge shape, whose thickness becomes gradually smaller along a normal to a light entrance surface 24C as the distance from the surface 24C increases. With this shape, space for the circuit board 18 is provided on the back side of the planar light source device 20. An optical sheet 27 is arranged on the light exit surface 24A of the light guide 24. The optical sheet 27 imparts predetermined optical characteristics to the light that exits from the light exit surface 24A of the light guide 24. For example, the optical sheet 27 may be a light collecting sheet which collects the light, or a light diffusing sheet which diffuses the light. A reflecting sheet 28 as an optical sheet is arranged on the counter surface 24B of the light guide 24. The reflecting sheet 28 reflects the light, which is leaked through the counter surface 24B of the light guide 24 so as to return the light to the light guide 24. The reflecting sheet 28, the light guide 24 and the optical sheet 27 are stacked and held in a frame 40.

The frame 40 has a rectangular shape corresponding to the liquid crystal display panel 10. It has substantially straight four frame portions 41, which respectively correspond to the four sides of the liquid crystal display panel 10. One of the frame portions 41, for example, the frame portion 41 which partially faces the flexible substrate 16, has two projections 42A and 42B parallel to each other. The projections 42A and 42B are formed integrally with this frame portion 41. The projections 42A and 42B extend in a direction, for example, substantially perpendicular to the frame 41.

As shown in FIG. 1, the coordinates position detecting device 30 has a sensor region 34 corresponding to the display region 11 of the liquid crystal display panel 10. The coordinates position detecting device 30 is arranged on the side of the back surface 20B of the planar light source device 20 so that the sensor region 34 corresponds to the display region 11 of the liquid crystal display panel 10. The coordinates position detecting device 30 detects coordinates of a position designated by a position designating device 32 on the display region 11. In the sensor region 34, a plurality of coil sensors 36 are arranged in parallel in, for example, X and Y directions. When the position designating device 32 is located near a coil sensor 36, the coordinates position detecting device 30 receives an electromagnetic wave (signal) from a resonance circuit 32A of the position designating device 32 through the coil sensor 36, and calculates the coordinates based on the strength of the signal.

Figure 3A:
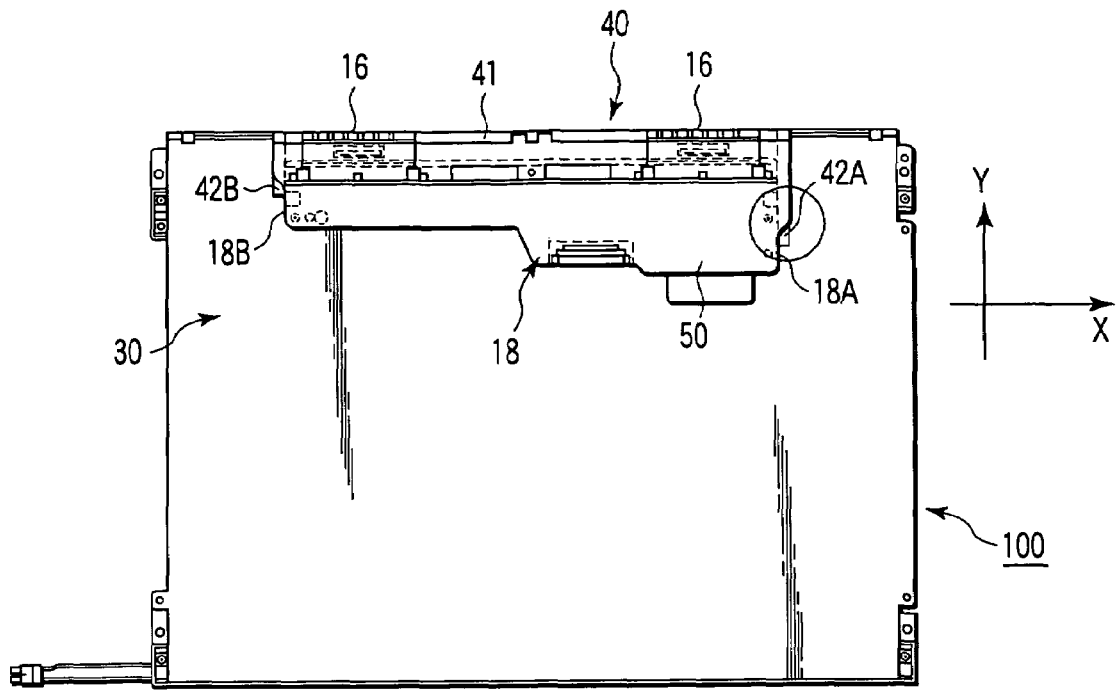
FIG. 3A is a back side view of the liquid crystal display panel of the liquid crystal display apparatus shown in FIG. 1.

As shown in FIG. 3A, the coordinates position detecting device 30 is interposed between the back surface 20B of the planar light source device 20 and the circuit board 18. A side of the coordinates position detecting device 30 is supported by the two projections 42A and 42B. The circuit board 18 has two end sides 18A and 18B extending in the Y direction and located between the two projections 42A and 42B. The two projections 42A and 42B extend substantially parallel to the two end sides 18A and 18B of the circuit board 18. The projection 42A will be described below.

Figure 3B:
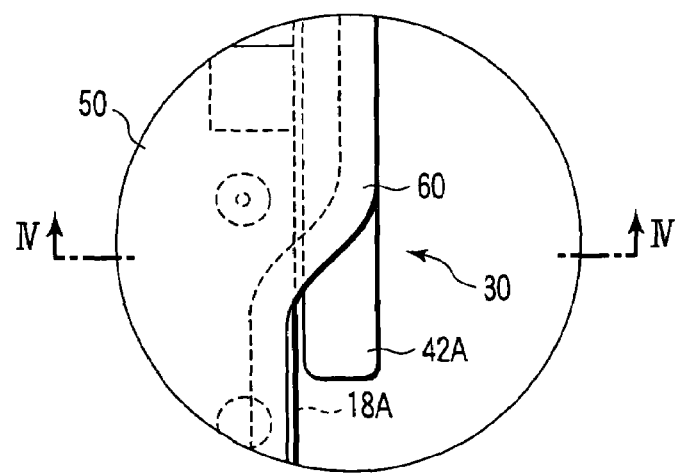
FIG. 3B is an enlarged view of the projecting portion and the surrounding region as viewed from the back side of the liquid crystal display panel shown in FIG. 1.
Figure 4:
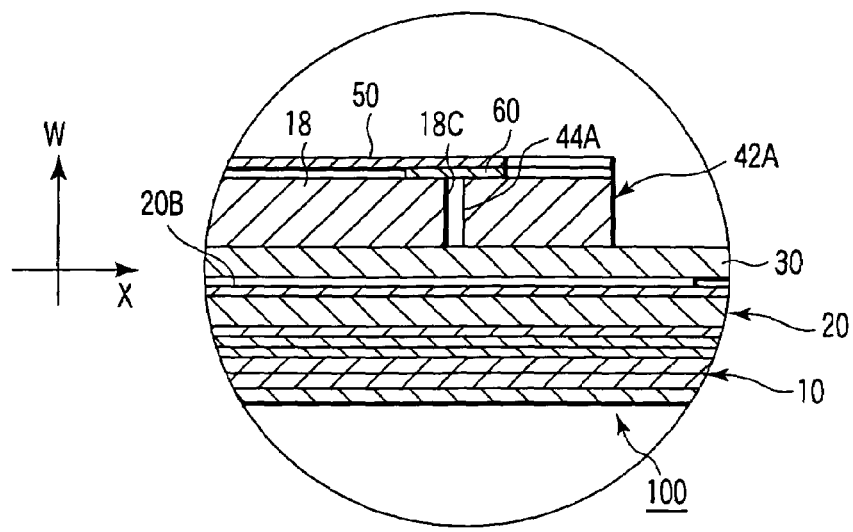
FIG. 4 is a cross-sectional view of the projection and its surroundings shown in FIG. 3B taken along the line IV-IV.

As shown in FIGS. 3B and 4, the projection 42A extends in the Y direction along the back surface 20B of the planar right source device 20 with a distance from the back surface 20B. The distance corresponds to the thickness (length in a W direction) of the coordinate position detecting device 30. The circuit board 18 is arranged beside the projection 42A along the X direction, substantially parallel to the back surface 20B of the planar light source device 20. In other words, the projection 42A extends on a plane substantially parallel to the back surface 20B of the planar light source device 20.

The circuit board 18 has a side surface 18C including the end side 18A. The circuit board 18 and the projection 42A are arranged side by side along the X direction such that the side surface 18C faces a side surface 44A of the projection 42A. An insulating sheet 50 is disposed over the projection 42A and the circuit board 18 on the back side of the projection 42A and the circuit board 18. The projection 42A and the circuit board 18 are fixed to the insulating sheet 50 by a double-faced tape 60. In other words, the circuit board 18 and the projection 42A are fixed to each other by the insulating sheet 50 and the double-faced tape 60. The projection 42A and the circuit board 18 desirably have substantially the same thickness (length in the W direction). In this case, the projection 42A and the circuit board 18 are more securely fixed to each other by the insulating sheet 50.

The projection 42B, as well as the projection 42A, extends in the Y direction along the back surface 20B of the planar light source device 20 with a distance from the back surface 20B. The distance corresponds to the thickness of the coordinate position detecting device 30. The projection 42B is located at a predetermined distance from the projection 42A in the X direction, and fixed to the circuit board 18 by the insulating sheet 50 and the double-faced tape 60 at the end side 18B of the circuit board 18.

As described above, because of the frame 40 provided with the projections 42A and 42B, the coordinates position detecting device 30 is held at the side of the back surface 20B of the planar light source device 20. In addition, the space for the coordinates position detecting device 30 is provided on the side of the back surface 20B of the planar light source device 20. With this structure, the circuit board 18 and the coordinates position detecting device 30 are fixed to each other by the projections 42A and 42B provided in the frame portion 41 of the frame 40 without using an additional part. As a result, the coordinates position detecting device 30 can be easily disposed between the planar light source 20 and the circuit board 18. Thus, the circuit board 18 and the coordinates position detecting device 30 can be easily positioned relative to each other.

Moreover, since the circuit board 18 is arranged beside the projections 42A and 42B in the X direction and on substantially the same plane as the back surface 20B of the planar light source device 20, the projections 42A and 42B do not overlap the circuit board 18. Therefore, the liquid crystal display apparatus 100 is not thickened by the projections 42A and 42B, and is consequently thin.

A second embodiment of the present invention will now be described. As well as the first embodiment, one of the frame portions 41, for example, the frame portion 41, which partially faces the flexible substrate 16, has two projections 42A and 42B parallel to each other. The projection 42B will be described below.

Figure 5:
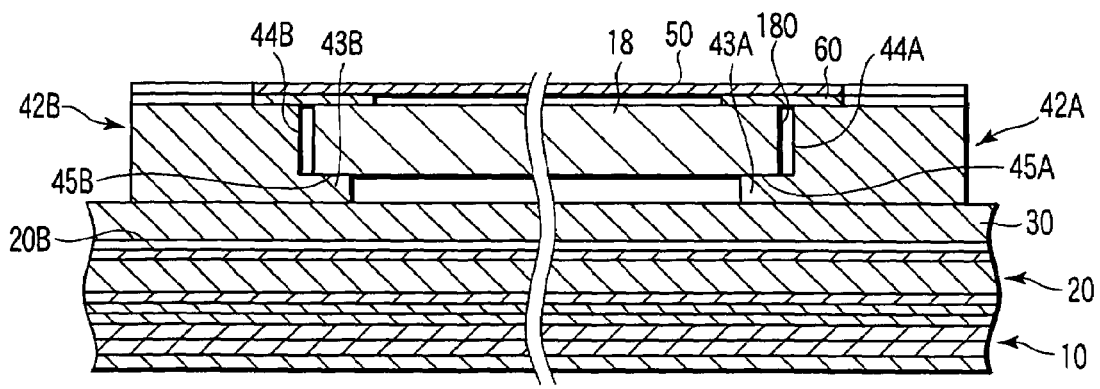
FIG. 5 is a cross-sectional view of the liquid crystal display apparatus according to another embodiment of the present invention.

As in the first embodiment, the projection 42A extends along the back surface 20B of the planar light source device 20 with a distance from the back surface 20B. The distance corresponds to the thickness of the coordinate position detecting device 30. As shown in FIG. 5, the projection 42A has a convex portion 43A extending between the circuit board 18 and the coordinates position detecting device 30. The projection 42A positions the circuit board 18 in the X and W directions with an upper surface 45A of the convex portion 43A and a side surface 44A which is opposing to the side surface 18C of the circuit board 18. An insulating sheet 50 is disposed on the back side of the circuit board 18 and the projection 42A. The projection 42A and the circuit board 18 are fixed to the insulating sheet 50 by a double-faced tape 60. The length of the side surface 44A in its thickness direction is desirably the same as the thickness of the circuit board 18. In this case, the circuit board 18 and the projection 42A are more securely fixed to each other by the insulating sheet 50.

The projection 42B, as well as the projection 42A, has a convex portion 43B extending between the circuit board 18 and the coordinates position detecting device 30. The projection 42B is located at a predetermined distance from the projection 42A along the X direction, and fixed to the insulating sheet 50 by the circuit board 18 and the double-faced tape 60 at the end opposite to the end fixed to the projection 42A.

As described above, because of the frame 40 provided with the projections 42A and 42B, as well as the first embodiment, the coordinates position detecting device 30 can easily be disposed between the back surface 20B of the planar light source 20 and the circuit board 18. Accordingly, the circuit board 18 and the coordinates position detecting device 30 can easily be positioned relative to each other. Moreover, since the projections 42A and 42B do not overlap the circuit board 18, the liquid crystal display apparatus 100 can be thin. Furthermore, because of the projections 42A and 42B provided with the convex portions 43A and 43B, the circuit board 18 is restrained from moving in the X and W directions. Therefore, the circuit board 18 can be positioned more easily.

Since the other constitutions of the second embodiment are the same as those of the first embodiment described above, they are identified by the same reference numerals as those used for the first embodiment and the descriptions thereof are omitted.

In both first and second embodiments, the thickness of the coordinates position detecting device 30 is 0.75 mm or less, and the thickness of the projections 42A and 42B is 0.4 mm or more.

The present invention is not limited to the above-mentioned embodiments and the elements can be variously modified when practiced without departing from the scope of the invention. Further, some of the plurality of elements of the above embodiments described above may be suitably combined, so that various inventions may be achieved. For example, some of the elements may be deleted from all elements of an embodiment. Furthermore, some elements of the different embodiments may be suitably combined.

For example, in the above embodiments, the frame has two projections extending along the end sides of the circuit board. However, either of the projections may be omitted; that is, the frame may have only one projection. Further, in the above embodiments, the, circuit board and the projections are fixed together to the insulating sheet by one double-faced tape. However, the circuit board and the projections may be independently fixed to the insulating sheet.

What is claimed is:

1. A liquid crystal display apparatus comprising:
a liquid crystal display panel including a display region in which a plurality of pixels are arrayed;
a planar light source device having a light exit surface which faces the liquid crystal display panel and from which planar light exits toward the liquid crystal display panel, and a back surface located opposite to the light exit surface;
a coordinates position detecting device which detects coordinates of a position designated on the display region;
a frame which has two projections and supports the liquid crystal display panel and the planar light source, the two projections being formed integrally with the frame and extending along the back surface of the planar light source device with a distance corresponding to a thickness of the coordinates position detecting device from the planar light source device; and
a circuit board which is electrically connected to the liquid crystal display panel and supplies a drive signal to the liquid crystal display panel,
wherein the projections are formed to extend from a side of the frame, substantially parallel to each other; the coordinates position detecting device is interposed between projections and the planar light source device and supported by the projections; and
the circuit board has an end side extending substantially parallel to the projections, and the circuit board is disposed on the back surface side of the planar light source device, arranged between the two projections, beside the projections on a plane substantially parallel to the back surface of the planar light source device, and ends thereof are fixed to the projections.

2. The liquid crystal display apparatus according to claim 1, wherein each of the two projections has a convex portion extending between the circuit board and the coordinates position detecting device.

3. The liquid crystal display apparatus according to claim 1, further comprising an insulating sheet disposed on a back surface of the circuit board, wherein the circuit board and the projections are fixed to the insulating sheet.

4. The liquid crystal display apparatus according to claim 1, wherein the circuit board is fixed to the projections by a tape.

\* \* \* \* \*